United States Patent
Tsai et al.

(10) Patent No.: US 8,111,009 B2
(45) Date of Patent: Feb. 7, 2012

(54) LIGHT ADJUSTMENT CIRCUIT FOR ALTERNATING-CURRENT LIGHT EMITTING DIODES (AC-LED'S)

(75) Inventors: Wen-Tien Tsai, Pingtung County (TW);
Bing-Chwen Yang, Hsinchu County (TW); Hwei-Shung Chong, Taoyuan County (TW); Chung-Yue Chen, Taipei (TW); Yie-Tone Chen, Taipei County (TW); Yao-Te Huang, Changhua County (TW); Li-Ling Lee, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 136 days.

(21) Appl. No.: 12/627,197

(22) Filed: Nov. 30, 2009

(65) Prior Publication Data

US 2011/0057568 A1    Mar. 10, 2011

(30) Foreign Application Priority Data

Sep. 7, 2009 (TW) .............................. 98130002 A

(51) Int. Cl.
*G05F 1/00* (2006.01)

(52) U.S. Cl. ........ 315/291; 315/294; 315/308; 315/309; 315/312; 315/185 R; 345/82

(58) Field of Classification Search .............. 315/291, 315/294, 308, 309, 312, 185 R, 224, 247, 315/122, 200 R, 217, DIG. 4; 345/82, 94, 345/690
See application file for complete search history.

(56) References Cited

U.S. PATENT DOCUMENTS

| | | | |
|---|---|---|---|
| 4,955,069 A | 9/1990 | Ionescu | |
| 7,489,086 B2 | 2/2009 | Miskin et al. | |
| 7,800,315 B2* | 9/2010 | Shteynberg et al. | 315/291 |
| 7,847,489 B2* | 12/2010 | Lin | 315/291 |
| 2004/0206970 A1 | 10/2004 | Martin | |
| 2008/0130288 A1 | 6/2008 | Catalano et al. | |
| 2010/0060181 A1* | 3/2010 | Choi et al. | 315/224 |
| 2010/0308738 A1* | 12/2010 | Shteynberg et al. | 315/185 R |
| 2011/0018449 A1* | 1/2011 | Lan et al. | 315/185 R |

FOREIGN PATENT DOCUMENTS

TW         251841 B    3/2006

OTHER PUBLICATIONS

European Patent Office, European Search Report, Dec. 6, 2010, Germany.

* cited by examiner

*Primary Examiner* — Haiss Philogene
(74) *Attorney, Agent, or Firm* — Morris Manning & Martin LLP; Tim Tingkang Xia, Esq.

(57) ABSTRACT

A light adjustment circuit for alternating-current light emitting diodes (AC-LED's) connected to an AC power supply and a plurality of AC-LED's comprises: a light adjustment unit, being capable of modulating AC power from the AC power supply while providing the plurality of AC-LED's with the modulated AC power; and a pulse width modulation (PWM) control circuit, being capable of modulating an external voltage signal in correspondence to variation in input AC power to enable each of the AC-LED's to achieve a predetermined brightness; wherein the AC-LED's are turned off by modulating the external voltage signal to prevent the AC-LED's from being burnt out when the input AC power is too high.

10 Claims, 10 Drawing Sheets

US 8,111,009 B2

LIGHT ADJUSTMENT CIRCUIT FOR ALTERNATING-CURRENT LIGHT EMITTING DIODES (AC-LED'S)

BACKGROUND OF THE INVENTION

1. Technical Field

This disclosure generally relates to a light adjustment circuit for alternating-current light emitting diodes (AC-LED's) and, more particularly, to a light adjustment circuit capable of adjusting the brightness of AC-LED's in correspondence to variation in input AC power to enable each of the AC-LED's to achieve a predetermined brightness with enhanced reliability and lifetime.

2. Technical Background

Unlike conventional direct-current light emitting diodes (DC-LED's) that require an AC-to-DC power supply, alternating-current light emitting diodes (AC-LED's) are novel and promising because they are directly driven by an AC power supply with higher efficiency and reliability than conventional DC-LED's.

However, variations in voltage and frequency of the input AC power supply affect the opto-electronics characteristics of the AC-LED's to cause unstable brightness of the AC-LED's since the AC-LED's are directly coupled to the AC power supply.

In view of the above, it is generally that a current-limiting resistor is serially connected so as to limit the current from the AC power supply and protect the AC-LED's from being burnt out. However, such a current-limiting resistor is only capable of limiting over-current and is unable to overcome the problems, such as affected output characteristics, due to variations in voltage and frequency of the AC power supply. Moreover, the current-limiting resistor causes power loss that lowers the power conversion rate and is unable to achieve light adjustment circuit for the AC-LED's.

Therefore, U.S. Pat. Pub. No. 2004/0206970 discloses an LED driving circuit as shown in FIG. 1. The LED driving circuit comprises a full-bridge rectifier 12 and an output filter capacitor 13 so as to rectify the AC power from an AC power supply 11 and provide a load (such as an LED) 14 with stable DC power. The output filter capacitor 13 filters the rectified voltage to provide stable DC power supply to the LED 14 even though the input AC power may be unstable. However, since the driving circuit provides DC power to the load, the DC power may be insufficient for AC-LED's as the load to cause lowered brightness. Meanwhile, the driving circuit is unable to achieve light adjustment circuit for the AC-LED's and to turn off the AC-LED's when the input voltage is too high.

U.S. Pat. No. 7,489,086 discloses an LED driving circuit as shown in FIG. 2. The LED driving circuit comprises a fixed high-frequency inverter 22 capable of converting the power from the input AC voltage or DC voltage 21 and providing a relatively constant voltage and relatively constant frequency output 24 to be delivered to a load (such an AC-LED). The ED driving circuit further comprises an AC regulator 23 that senses changes to the load at the output lines of the inverter 22 and feeds back a voltage signal to the inverter 22 in response to changes in the load which makes adjustments accordingly to maintain a relatively constant voltage output with the relatively constant frequency output. However, the LED driving circuit is complicated with high cost and is unable to turn off the AC-LED when the input voltage is too high.

TW Pat. Appl. No. 095146805 discloses an LED driving circuit as shown in FIG. 3. In FIG. 3, an AC-LED array 31 disposed between two terminals 33 and 34 is connected in series or in parallel with an element 32 being a resistor, a capacitor, a Zener diode or a surge absorber so that the LED driving circuit provides temperature compensation, voltage correction or surge protection.

In addition, phase control has been reported using a zero voltage detection circuit to achieve light adjustment for AC-LED's. However, it fails to turn off the AC-LED's when the input voltage is too high.

This disclosure provides a light adjustment circuit for AC-LED's, capable of adjusting the brightness of AC-LED's in correspondence to variation in input AC power to enable each of the AC-LED's to achieve a predetermined brightness with enhanced reliability and lifetime.

SUMMARY OF THIS DISCLOSURE

In view of the above, this disclosure discloses a light adjustment circuit for AC-LED's, capable of adjusting the brightness of AC-LED's in correspondence to variation in input AC power to enable each of the AC-LED's to achieve a predetermined brightness with enhanced reliability and lifetime.

In one embodiment, this disclosure provides a light adjustment circuit for alternating-current light emitting diodes (AC-LED's), the light adjustment circuit being connected to an AC power supply and a plurality of AC-LED's, the light adjustment circuit comprising:

a light adjustment unit, being capable of modulating AC power from the AC power supply while providing the plurality of AC-LED's with the modulated AC power; and a pulse width modulation (PWM) control circuit, being capable of modulating an external voltage signal in correspondence to variation in input AC power to enable each of the AC-LED's to achieve a predetermined brightness;

wherein the AC-LED's are turned off by modulating the external voltage signal to prevent the AC-LED's from being burnt out when the input AC power is too high.

BRIEF DESCRIPTION OF THE DRAWINGS

The embodiments of this disclosure will be readily understood by the accompanying drawings and detailed descriptions, wherein.

DETAILED DESCRIPTION OF THIS DISCLOSURE

This disclosure can be exemplified but not limited by various embodiments as described hereinafter.

Figure 1:
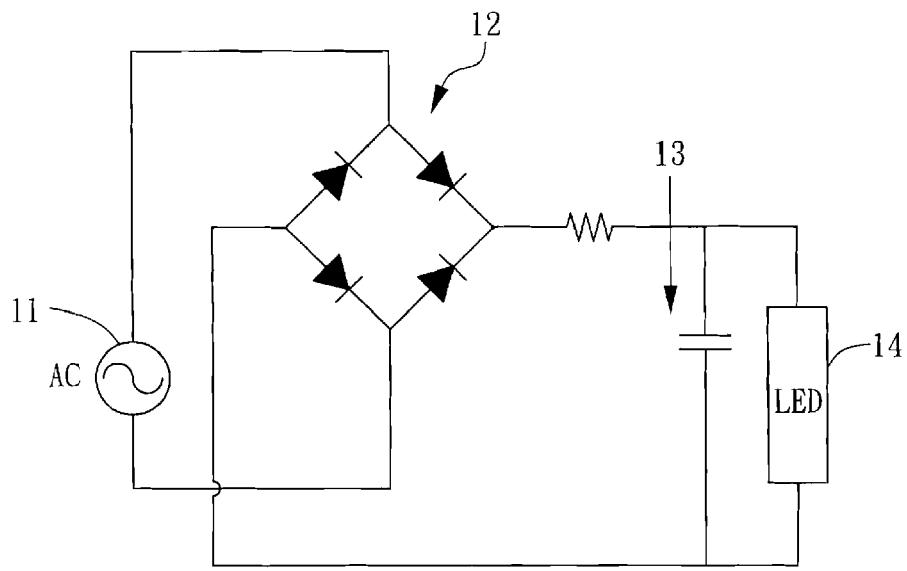
FIG. 1 is a circuit diagram of a conventional LED driving circuit in U.S. Pat. Pub. No. 2004/0206970.
Figure 2:
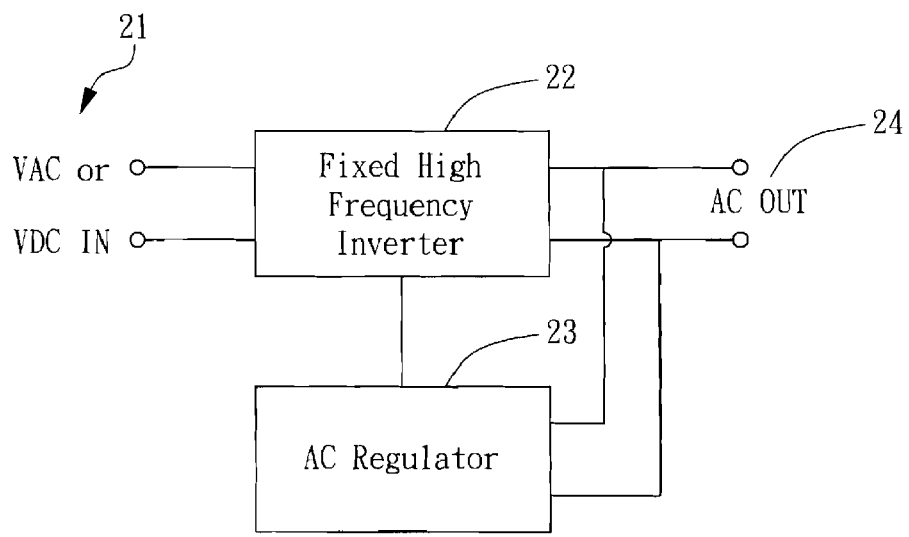
FIG. 2 is another circuit diagram of a conventional LED driving circuit in U.S. Pat. No. 7,489,086.
Figure 3:
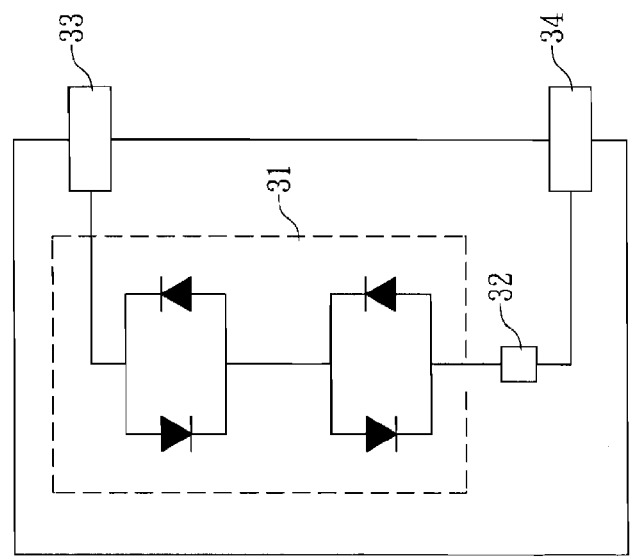
FIG. 3 is another circuit diagram of a conventional LED driving circuit in TW Pat. Appl. No. 095146805.
Figure 4A:
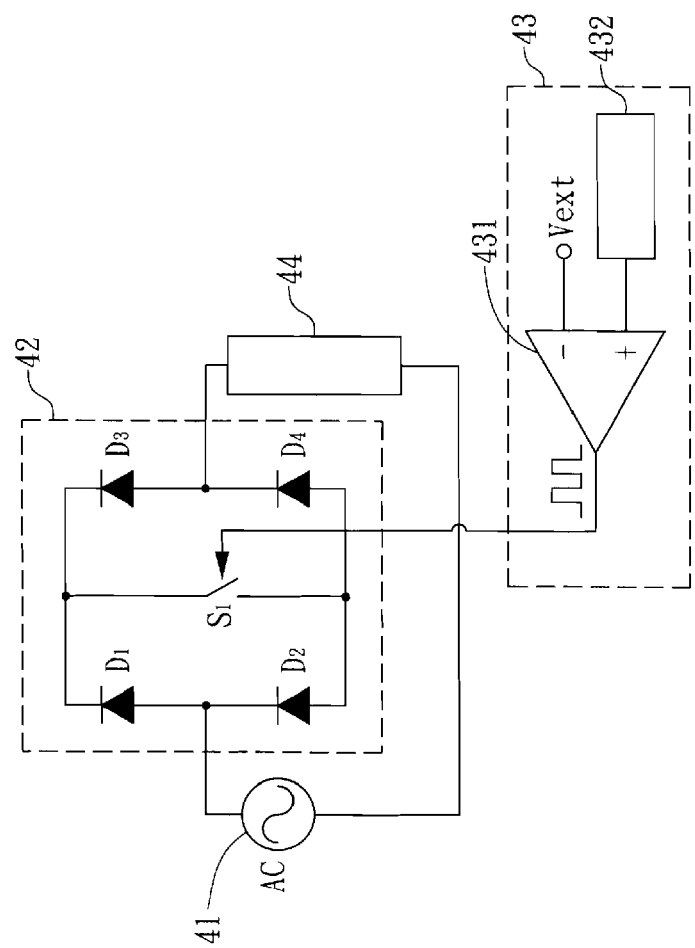
FIG. 4A is a circuit diagram of a light adjustment circuit for AC-LED's according to a first embodiment of this disclosure.

Please refer to FIG. 4A, which is a circuit diagram of a light adjustment circuit for AC-LED's according to a first embodiment of this disclosure. In FIG. 4A, the light adjustment circuit comprises an light adjustment unit 42 (composed of diodes D1, D2, D3, D4 and a control switch S1) and pulse width modulation (PWM) control circuit 43 to adjust the brightness of AC-LED's 44 in correspondence to variation in input AC power from an AC power supply 41 to enable each of the AC-LED's 44 to achieve a predetermined brightness. An external voltage signal Vext is compared with a triangle wave or a sawtooth wave from a ramp generator 432 to obtain light adjustment signals with different duty cycles. The light adjustment signal is then transmitted to the control switch S1 to control the power delivered to the AC-LED's.

The control switch determines the value of the current delivered to the AC-LED's according to the duty cycle. Therefore, as the duty cycle of the control switch S1 increases, the control switch S1 allows larger power to be delivered to the AC-LED's to improve the AC-LED brightness. On the contrary, as the duty cycle of the control switch S1 decreases, the control switch S1 allows smaller power to be delivered to the AC-LED's to lower the AC-LED brightness. The control switch S1 is disposed between the four diodes D1, D2, D3, D4 so that the light adjustment circuit is capable of achieving light adjustment during both positive half cycle and negative half cycle.

The PWM control circuit 43 can be analog and comprise a ramp generator 432 and a comparator 431. The ramp generator 432 is capable of generating a triangle wave or a sawtooth wave. The comparator 431 has a negative input terminal receiving the external voltage signal Vext and a positive input terminal connected to the ramp generator 432, so that the comparator 431 performs voltage comparison on an input ramp signal at the positive input terminal and the external voltage signal Vext at the negative input terminal so as to output a pulse width modulation (PWM) signal at an output terminal of the comparator 431. A higher duty cycle results from a lowered external voltage signal Vext. On the contrary, as the external voltage signal Vext increases, the duty cycle is lowered. The PWM signal is transmitted to control switch S1 as a light adjustment signal to achieve light adjustment for the AC-LED's.

In addition to the analog PWM control circuit 43 described above, the PWM control circuit 43 can also be digital and comprise a digital controller. The digital controller is capable of receiving an external voltage signal Vext that is to be processed by the digital controller to output a PWM signal. The external voltage signal Vext can be used to adjust the brightness according to variation in input AC power and the requirements of the user.

Figure 5:
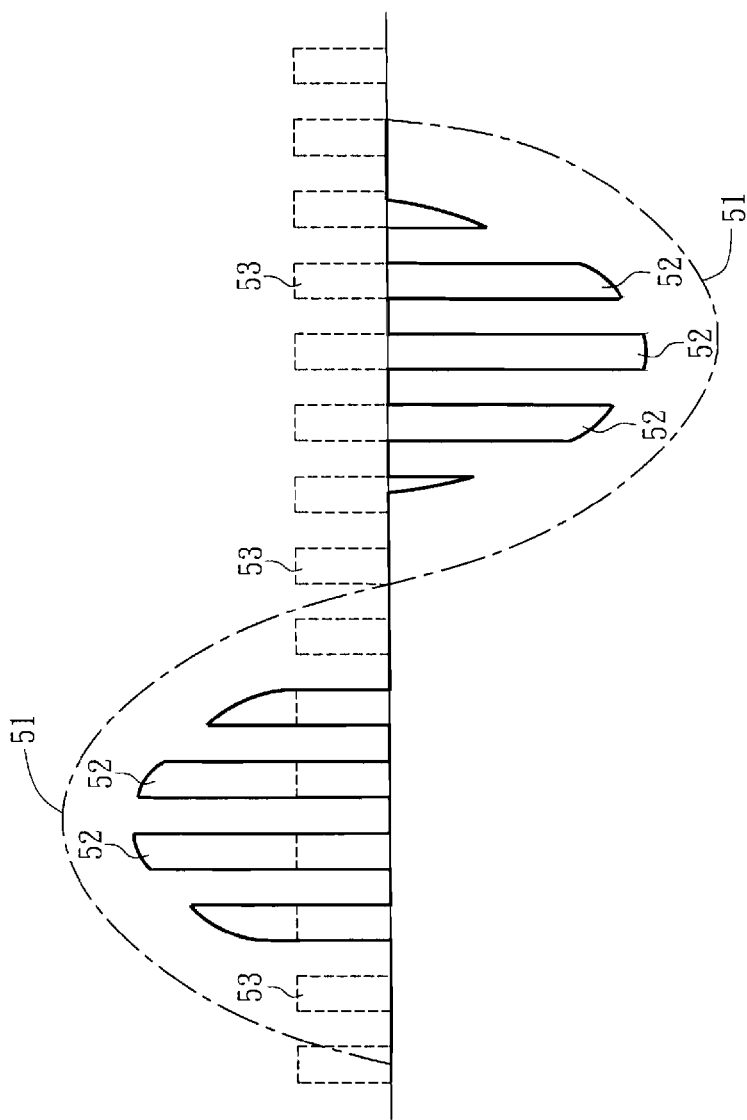
FIG. 5 is a waveform diagram for light adjustment using the light adjustment circuit in FIG. 4A.

Please refer to FIG. 5, which is a waveform diagram for light adjustment using the light adjustment circuit in FIG. 4A. In FIG. 5, the waveform diagram represents an input power signal 51, an AC-LED current signal 52 and a PWM signal 53. When the input power signal (from the AC utility) 51 rises, the AC-LED current signal 52 rises. The duty cycle of the PWM signal 53 can be lowered by modulating the external voltage signal Vext to lower the power (in terms of current) delivered to the AC-LED's. Therefore, the current signal 52 of the AC-LED's is decreased to achieve a predetermined brightness. On the contrary, when the input power signal 51 falls, the AC-LED current signal 52 falls. The duty cycle of the PWM signal 53 can be increased by modulating the external voltage signal Vext to increase the power delivered to the AC-LED's. Therefore, the current signal 52 of the AC-LED's is increased to achieve a predetermined brightness. When the temperature of the AC-LED's is too high, the external voltage signal Vext can be adjusted to lower the duty cycle to zero. Meanwhile, the control switch S1 is completely turned off to protect the AC-LED's.

The external voltage signal Vext can be coupled to a voltage feedback circuit, a current feedback circuit, a temperature feedback circuit or an external light adjustment signal. The external voltage signal Vext can be coupled to a voltage feedback circuit to detect the input AC power or a voltage cross the AC-LED's to monitor the AC-LED's. The external voltage signal Vext can be coupled to a current feedback circuit to detect the input AC power or a current flowing through the AC-LED's to monitor the AC-LED's. The external voltage signal Vext can be coupled to a temperature feedback circuit comprising a temperature detector and a signal transformer. The temperature detector is attached to the AC-LED's to obtain a temperature value transformed to the temperature feedback signal by the signal transformer so as to provide the PWM control circuit with the temperature feedback signal whose duty cycle is to be adjusted by the PWM control circuit. The external light adjustment signal can be analog or digital to adjust the brightness of the AC-LED's.

Figure 4B:
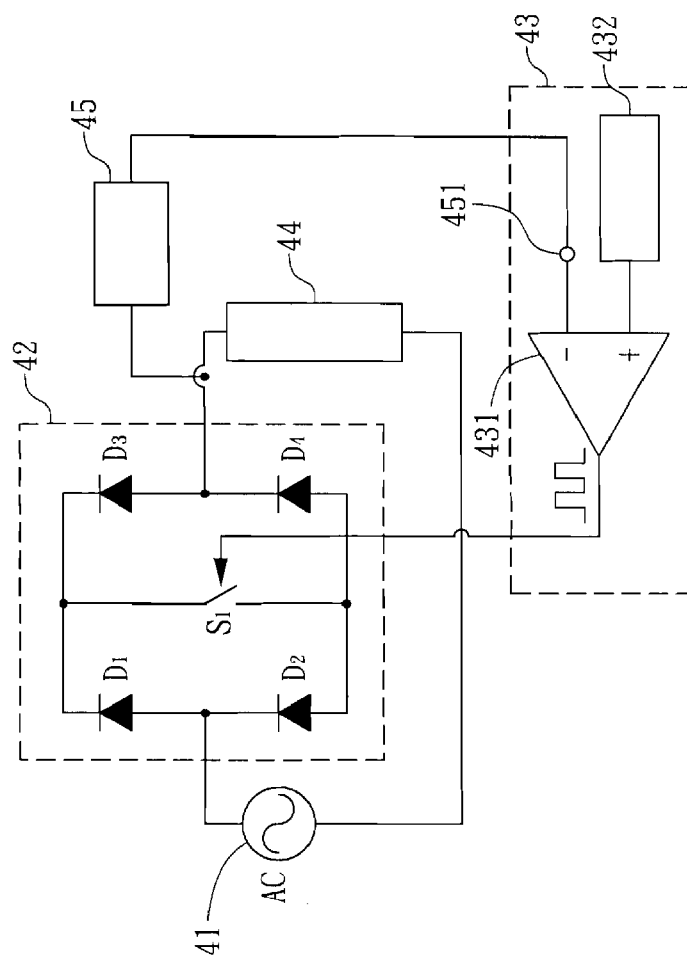
FIG. 4B is a circuit diagram of a light adjustment circuit for AC-LED's according to a second embodiment of this disclosure.
Figure 4C:
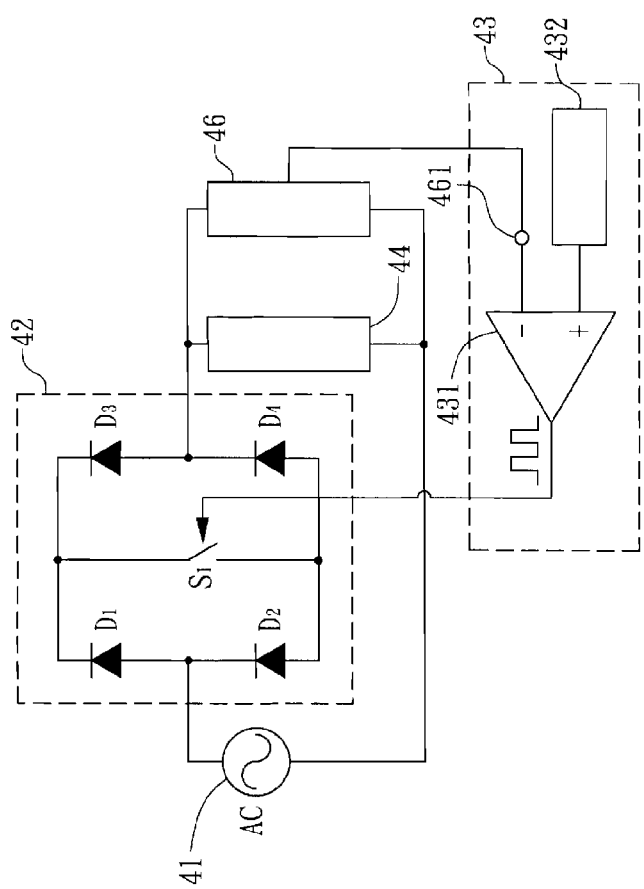
FIG. 4C is a circuit diagram of a light adjustment circuit for AC-LED's according to a third embodiment of this disclosure.
Figure 4D:
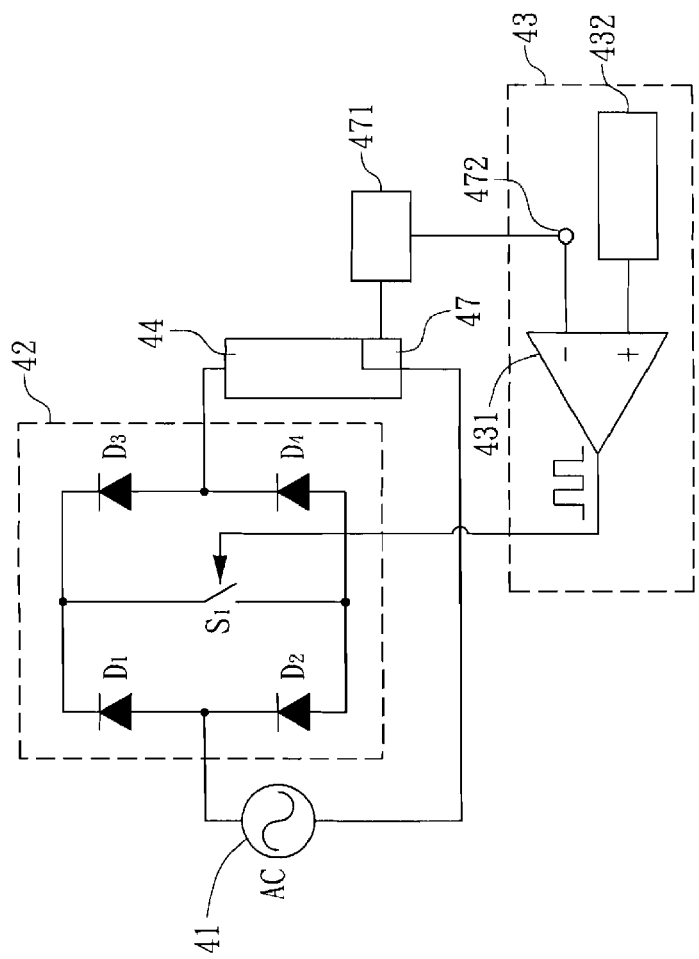
FIG. 4D is a circuit diagram of a light adjustment circuit for AC-LED's according to a fourth embodiment of this disclosure.
Figure 4E:
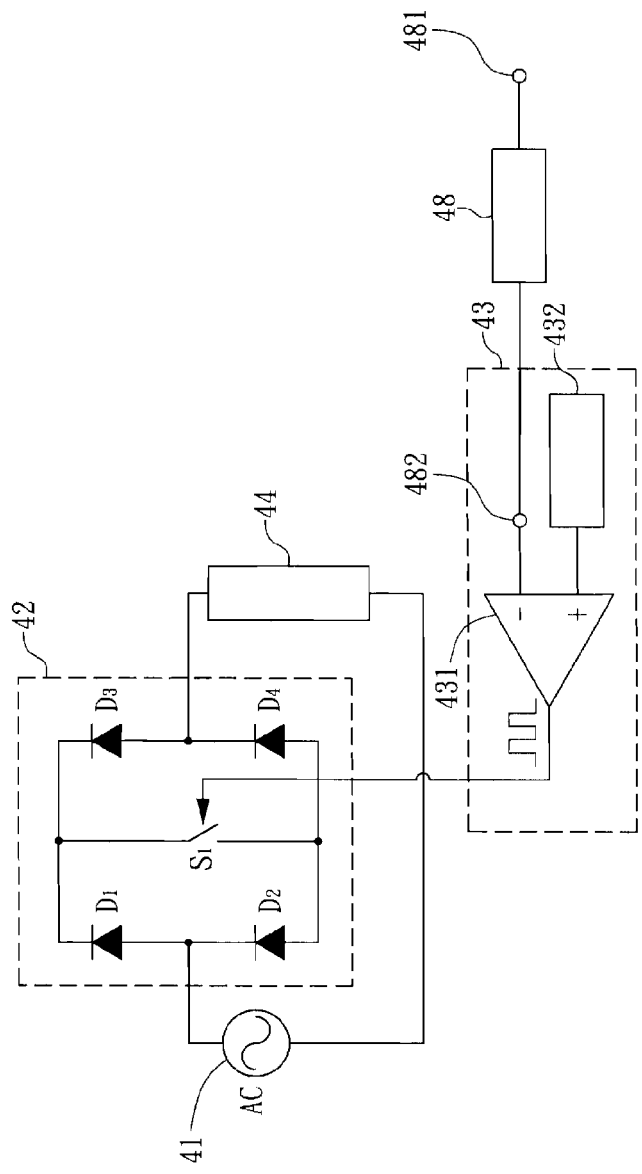
FIG. 4E is a circuit diagram of a light adjustment circuit for AC-LED's according to a fifth embodiment of this disclosure.

Please refer to FIG. 4B, FIG. 4C, FIG. 4D and FIG. 4E for a circuit diagram of a light adjustment circuit for AC-LED's according to a second, a third, a fourth and a fifth embodiments of this disclosure. In FIG. 4B, the external voltage signal Vext is coupled to a current feedback circuit. The current feedback circuit comprises a current detector 45 receiving a current feedback signal 451. The current detector 45 is connected in series with the AC-LED's 44 to obtain the value of the AC-LED current whose duty cycle is to be adjusted by the PWM control circuit 43. Similarly, in FIG. 4C, the external voltage signal Vext is coupled to a voltage feedback circuit. The voltage feedback circuit comprises a voltage detector 46 receiving a voltage feedback signal 461. The voltage detector 46 is connected in parallel with the AC-LED's 44 to obtain the value of the AC-LED voltage whose duty cycle is to be adjusted by the PWM control circuit 43. In FIG. 4D, the external voltage signal Vext is coupled to a temperature feedback circuit. The temperature feedback circuit comprises a temperature detector 47 and a signal transformer 471. The temperature detector 47 is attached to the AC-LED's 44 to obtain a temperature value transformed to a temperature feedback signal 472 by the signal transformer 471 so as to provide the PWM control circuit 43 with the temperature feedback signal 472 whose duty cycle is to be adjusted by the PWM control circuit 43. In FIG. 4E, the external voltage signal Vext is coupled to an analog or a digital transformer 48 receiving an external analog or a digital light adjustment signal 481 to be transformed to an adjusted signal 482 whose duty cycle is to be adjusted by the PWM control circuit 43.

Figure 6:
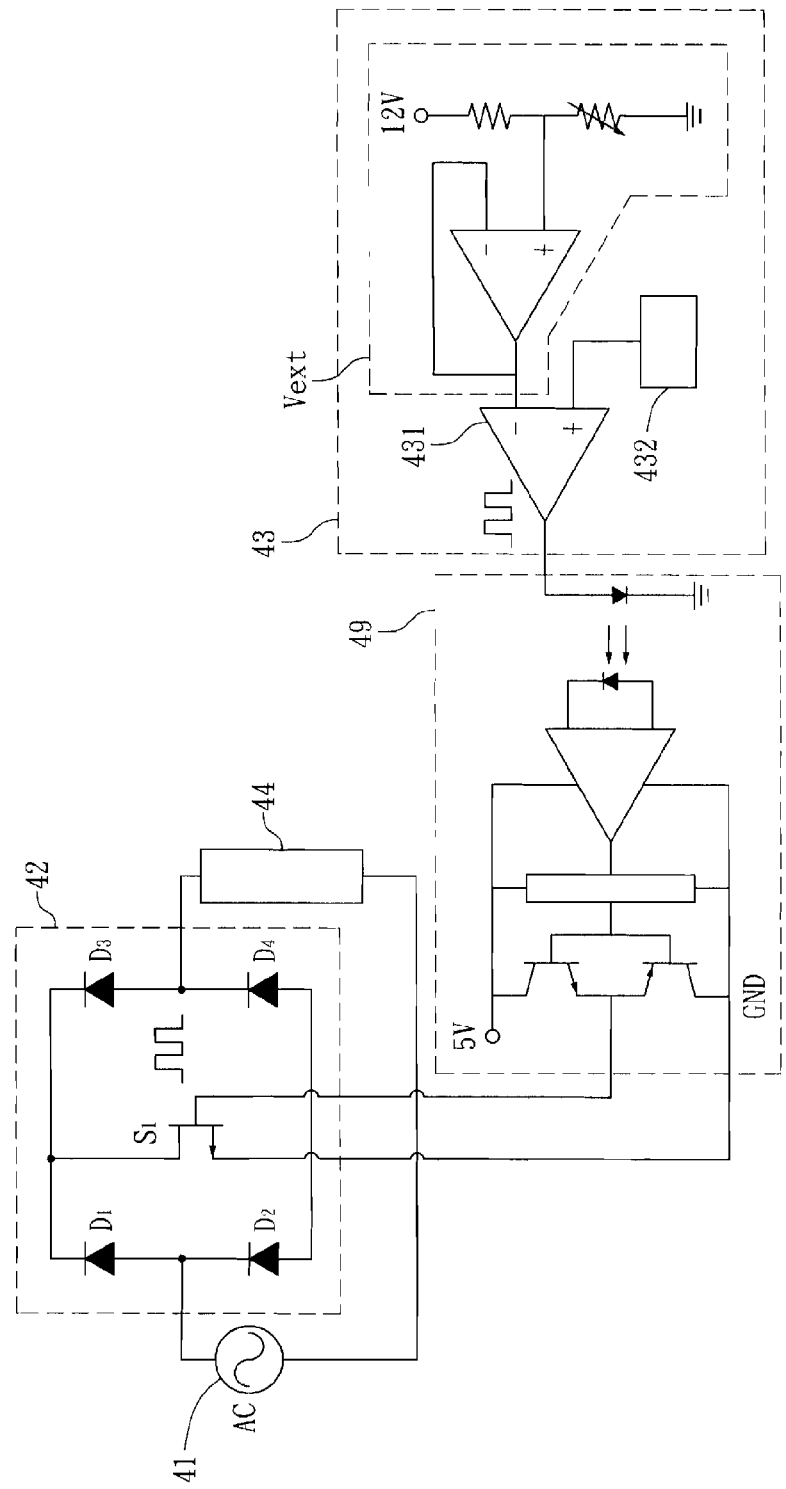
FIG. 6 is a detailed circuit of the circuit diagram of FIG. 4A.

FIG. 6 is a detailed circuit of the circuit diagram of FIG. 4A. In FIG. 6, a comparator 431 performs a comparison on an external voltage signal Vext sampled by an operational amplifier and a sawtooth wave to obtain signals with different duty cycles. Then, a light isolator 49 transmits the signals to the control switch 51 in the light adjustment unit 42 to control the turn-on time of the control switch 51 to complete light adjustment for the AC-LED's. The light isolator 49 is disposed between the light adjustment unit 42 and the PWM control circuit 43.

Figure 8:
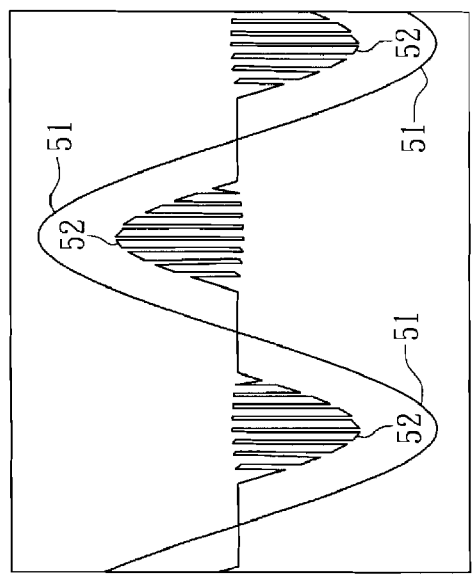
FIG. 8 shows the waveform of voltage and current when the input voltage is 120 Vrms, the resistance of the current-limiting resistor is 100Ω and the duty cycle is 64%.
Figure 7:
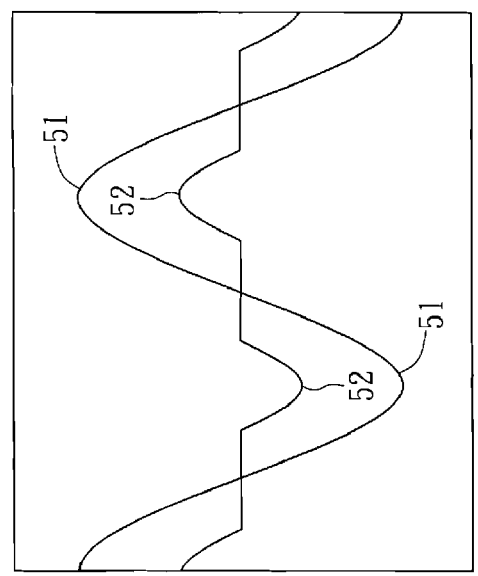
FIG. 7 shows the waveform of voltage and current when the input voltage is 110 Vrms, the resistance of the current-limiting resistor is 100Ω and the duty cycle is 100%.

FIG. 7 and FIG. 8 show the waveform of voltage and current when the input voltage is 110 and 120 Vrms, respectively. When the input voltage is 110 Vrms, the illuminance is 1205 Lux. As the input voltage rises to 120 Vrms, the illuminance increases up to 1730 Lux. Meanwhile, the duty cycle falls from 100% to 64% to keep the illuminance at 1205 Lux. Therefore, the light adjustment circuit of this disclosure can be experimentally demonstrated by adjusting the duty cycle of the PWM signal of the control switch to achieve light adjustment for the AC-LED's.

This disclosure discloses a light adjustment circuit capable of adjusting the brightness of AC-LED's in correspondence to variation in input AC power to enable each of the AC-LED's to achieve a predetermined brightness with enhanced reliability and lifetime. Therefore, this disclosure is useful, novel and non-obvious.

Although this disclosure has been disclosed and illustrated with reference accelerometer to particular embodiments, the principles involved are susceptible for use in numerous other embodiments that will be apparent to persons skilled in the art. This disclosure is, therefore, to be limited only as indicated by the scope of the appended claims.

What is claimed is:

1. A light adjustment circuit for alternating-current light emitting diodes (AC-LED's), the light adjustment circuit being connected to an AC power supply and a plurality of AC-LED's, the light adjustment circuit comprising:
   a light adjustment unit, modulating AC power from the AC power supply while providing the plurality of AC-LED's with the modulated AC power; and
   a pulse width modulation (PWM) control circuit, modulating an external voltage signal in correspondence to variation in input AC power to enable each of the AC-LED's to achieve a predetermined brightness;
   wherein the AC-LED's are turned off by modulating the external voltage signal to prevent the AC-LED's from being burnt out when the input AC power is too high.

2. The light adjustment circuit for AC-LED's as recited in claim 1, wherein the light adjustment unit further comprises:
   a control switch with a duty cycle determining a value of a current delivered to the AC-LED's; and
   a full-bridge circuit composed of four diodes;
   wherein the control switch is disposed between the four diodes so that the light adjustment circuit achieves light adjustment during both positive half cycle and negative half cycle.

3. The light adjustment circuit for AC-LED's as recited in claim 1, wherein the PWM control circuit is an analog PWM control circuit or a digital PWM control circuit.

4. The light adjustment circuit for AC-LED's as recited in claim 3, wherein the analog PWM control circuit comprises:
   a ramp generator, generating a triangle wave or a sawtooth wave; and
   a comparator, having a negative input terminal receiving the external voltage signal and a positive input terminal connected to the ramp generator, so that the comparator performs voltage comparison on an input ramp signal at the positive input terminal and the external voltage signal at the negative input terminal so as to output a pulse width modulation (PWM) signal at an output terminal of the comparator.

5. The light adjustment circuit for AC-LED's as recited in claim 3, wherein the digital PWM control circuit comprises:
   a digital controller, receiving the external voltage signal that is to be processed by the digital controller to output a PWM signal.

6. The light adjustment circuit for AC-LED's as recited in claim 1, wherein the external voltage signal is coupled to a voltage feedback circuit to detect the input AC power or a voltage cross the AC-LED's to monitor the AC-LED's.

7. The light adjustment circuit for AC-LED's as recited in claim 1, wherein the external voltage signal is coupled to a current feedback circuit to detect the input AC power or a current flowing through the AC-LED's to monitor the AC-LED's.

8. The light adjustment circuit for AC-LED's as recited in claim 1, wherein the external voltage signal is coupled to a temperature feedback circuit comprising a temperature detector and a signal transformer, the temperature detector being attached to the AC-LED's to obtain a temperature value transformed to a temperature feedback signal by the signal transformer so as to provide the PWM control circuit with the temperature feedback signal whose duty cycle is to be adjusted by the PWM control circuit.

9. The light adjustment circuit for AC-LED's as recited in claim 1, wherein the external voltage signal is coupled to an external light adjustment signal, being analog or digital, to adjust the brightness of the AC-LED's.

10. The light adjustment circuit for AC-LED's as recited in claim 1, further comprising a light isolator disposed between the light adjustment unit and the PWM control circuit.

* * * * *